Sept. 1, 1942.   T. H. PRICE   2,294,800
MODULATION SYSTEM
Filed Aug. 9, 1941   6 Sheets-Sheet 1

INVENTOR
*Thomas H. Price*
BY
*H. G. Grover*
ATTORNEY

Sept. 1, 1942.    T. H. PRICE    2,294,800
MODULATION SYSTEM
Filed Aug. 9, 1941    6 Sheets-Sheet 3

INVENTOR
Thomas H. Price
BY H. G. Grover
ATTORNEY

Sept. 1, 1942.  T. H. PRICE  2,294,800
MODULATION SYSTEM
Filed Aug. 9, 1941    6 Sheets-Sheet 6

INVENTOR
Thomas H. Price
BY
ATTORNEY

Patented Sept. 1, 1942

2,294,800

UNITED STATES PATENT OFFICE 2,294,800

MODULATION SYSTEM

Thomas Henry Price, Chelmsford, England, assignor to Radio Corporation of America, a corporation of Delaware Application August 9, 1941, Serial No. 406,213
In Great Britain April 3, 1940

13 Claims. (Cl. 179—171.5)

The present invention relates to amplification systems for modulated carriers in radio and like transmitters.

Particularly, the invention relates to a system wherein amplitude modulation of the significant voltage output is involved, and modulation is effected by varying the voltages applied to the grids of a transmitter output power stage, in amplitude for the negative portion of the modulation cycle and primarily in relative phase angle for a positive portion of the modulation cycle. In the system of the invention, both amplitude and phase changes occur; the system might, therefore, be referred to as an "Ampliphase" system.

In carrying the invention into effect carrier frequency voltages having a predetermined phase relationship and predetermined amplitudes, in the modulated condition, are applied to the control grids of a pair of valves in the main power-stage of the transmitter which feed in an additive manner into a common load circuit, the phase relationship and amplitudes of the carrier frequency voltages, for positive modulation half waves moving from the said determined phase relationship and amplitudes, and, for negative modulation half waves retaining their predetermined phase relationship but varying in amplitude in like sense and in constant ratio. The voltages applied to the control grids of the valves are resultant voltages, one component of each resultant voltage being in phase with the like component of the other resultant voltage, and the other component of each resultant voltage being in the opposite phase to the like other component of the other resultant voltage. The circuit arrangements are such that for positive modulation half waves the amplitudes of both components of either resultant voltage vary in opposite sense (that is, one component of one resultant increases and the other component of the same resultant decreases), while for negative modulation half waves the amplitudes of both components of either resultant voltage vary in like sense (i. e. both components of one resultant increase or decrease together). The ratio of variation of the two components is preferably constant.

For convenience of nomenclature the component of voltage which is applied to the control grids in like phase will be referred to as the first voltage, and the component of voltage which is applied to the control grids in opposite phase will be referred to as the second voltage. The valves in the main power stage operate in the system referred to at a predetermined (e. g. carrier) level of applied voltage, such as to give the maximum efficiency of class B operated linear amplifiers, that is, about 66%.

According to the invention a modulation system of the kind in which the negative portion of the modulation cycle produces a decrease in the amplitude of the exciting voltages applied to the grids of transmitter output valve stage and the positive portion produces a decrease in the relative phase angle between the said exciting voltages, and wherein said exciting voltages are resultant voltages one component (the first voltage) of each resultant voltage being in phase with that of the other and the other component (the second voltage) being in antiphase with that of the other, is characterized by the provision of means for varying the amplitude of the second voltage in accordance with variation in the ratio of the amplitude of the modulated input voltage and the energy in said load circuit whereby to compensate for saturation-distortion produced by said amplifiers.

The means for producing the second said voltage comprises the use of an impedance inverting network and a further amplifier in combination with means for producing a correction voltage for application to said amplifier whereby to cause said amplifier to operate as an oscillation generator.

The means for producing the said correction voltage may comprise a balanced amplifier system including a pair of valves and a common oscillatory output circuit therefor, one of said valves being fed with modulated energy from said source of modulated energy and the other of said valves being fed with energy from the said load circuit.

In a modification of the invention, the second voltage is varied by a further amplifier stage comprising means for applying energy from the modulator to the anode of said further valve stage by way of a phase displacing network, means for applying carrier energy from a source of such to the grid of said further valve stage in phase with carrier energy applied to its anode; and means for applying modulation energy to said grid of said further valve.

The invention is illustrated in the accompanying drawings wherein Figures 1 and 4 are block diagrams.

Figures 1, 3A, 3B, 3C:
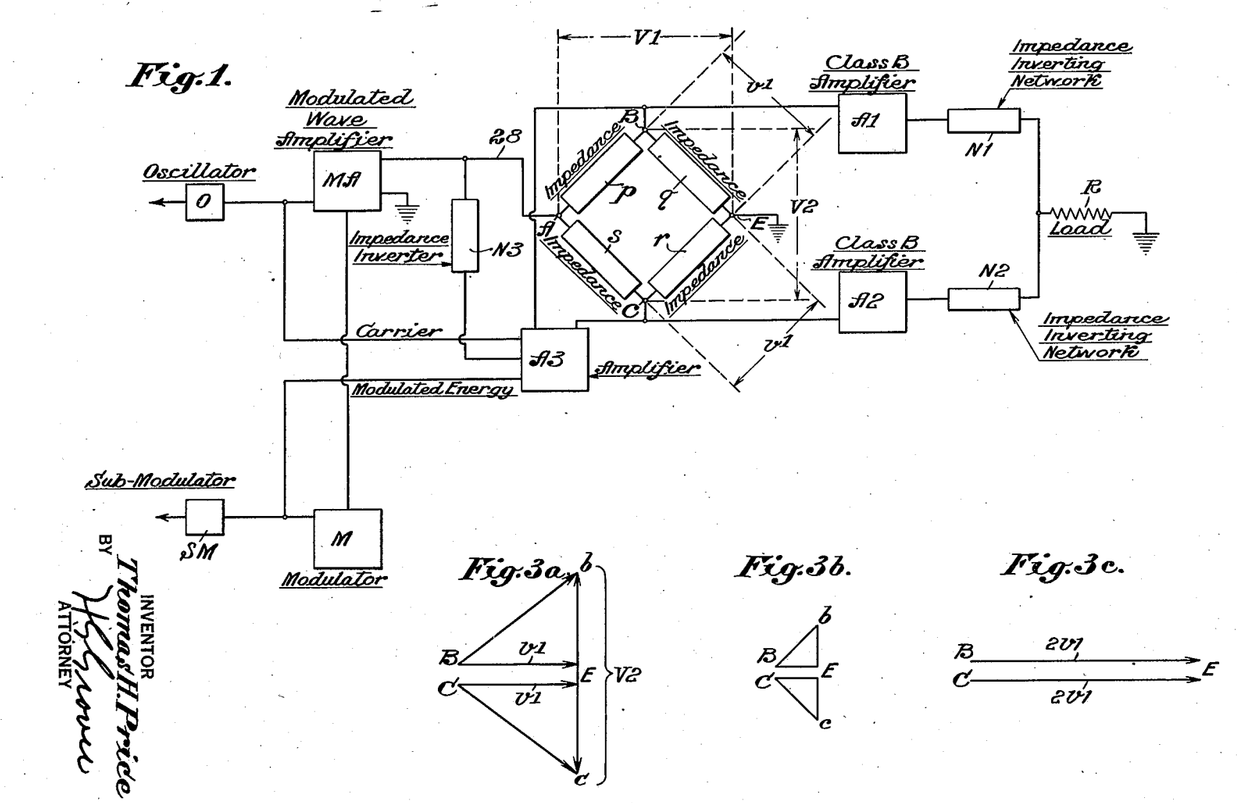
Figure 2:
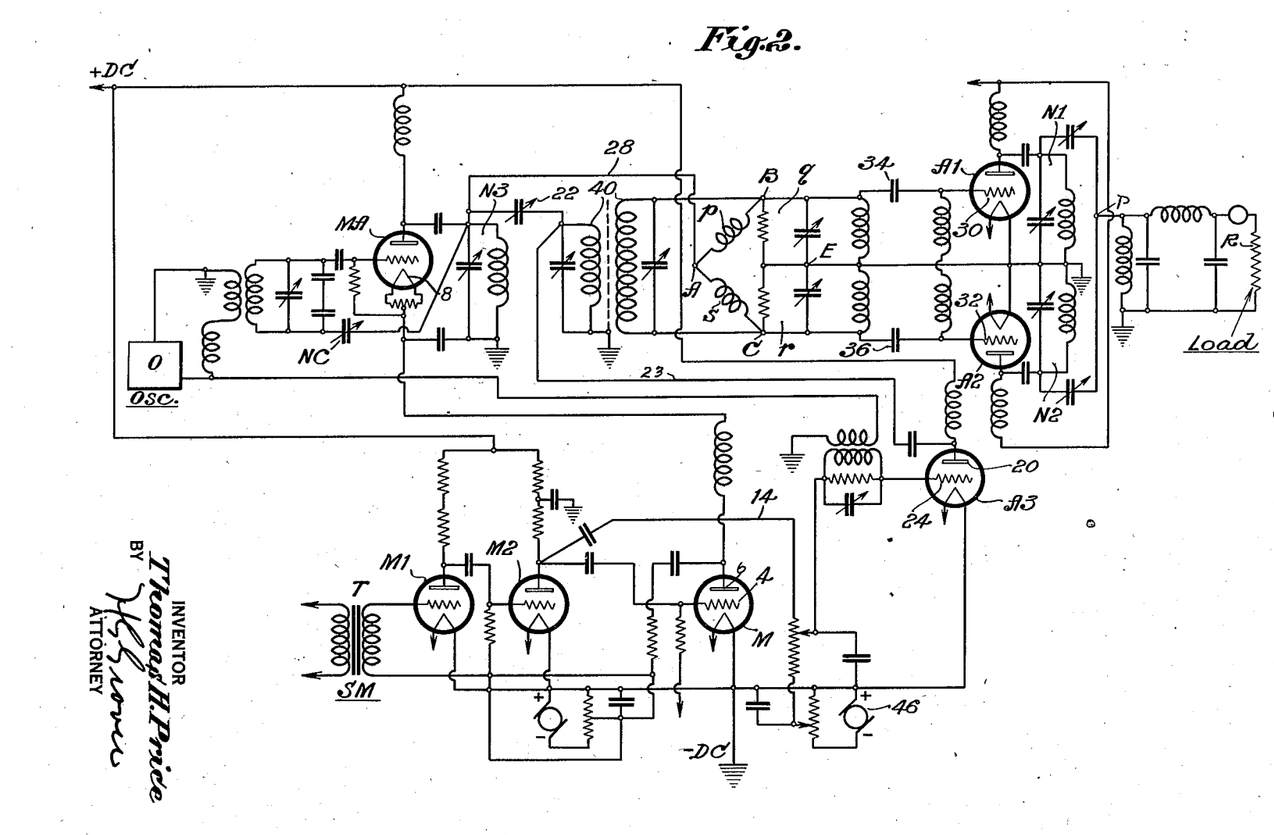
Figure 2 is a circuit diagram of the arrangement of Figure 1, and Figures 3a, 3b and 3c are vector diagrams applicable to the system of Figures 1 and 4.

In Figures 1 and 2, O and SM represent respectively an oscillator and a sub-modulator, M and MA represent respectively a modulator and modulated amplifier. The modulator tube M has its grid 4 excited by modulating potentials amplified in tubes M1 and M2 and its anode 6 connected to the cathode 8 of tube Ma. Carrier wave amplifier MA and modulation amplifier M have their impedances in series and are connected across a direct current source so that the carrier amplified in MA is modulated in a manner described more in detail in my United States Patent No. 2,013,807. A3 is an amplifier to the anode 20 of which energy from the output of MA is applied by way of N3 which is an impedance inverting and phase displacing network and coupling condenser 22. The grid 24 of A3 has applied thereto from oscillator O and SM respectively carrier and modulation energy, the carrier energy being in phase with the carrier energy applied to its anode. The modulation energy from SM is amplified in modulation amplifier M2 and fed by lead 14 to potentiometer 16 and then to grid 24. $p$, $q$, $r$ and $s$ are the four arms of a Wheatstone bridge, $p$ and $s$ preferably being constituted as impedance inverting networks. A, B, C and E are points respectively between $p$ and $s$, $p$ and $q$, $s$ and $r$, and $q$ and $r$. A and E are at the end of one diagonal and B and C at the ends of the other diagonal of the bridge. Energy from the modulated amplifier MA is applied through lead 28 across the diagonal A—E. A1 and A2 are electron discharge amplifier tubes of a pair of such, polarized to class B operation, which feed in an additive manner through N1 and N2 respectively, into R which is a load and may be an aerial. The grids 30 and 32 of tubes A1 and A2 are coupled by condensers 34 and 36 across diagonal B—C of the bridge circuit. The bridge diagonal B—C is also coupled by transformer 40 to the output of Ma. N1 and N2 are impedance inverting networks.

The phase displacing network N3 produces a 90 degree phase shift.

As the result of the connection of MA across diagonal A—E, a voltage V1 appears across this diagonal and portions of the modulated voltage appear between points B and E and between points C and E of the bridge network, these two portions being in equal phase for the two arms BE and CE. These two portions may be represented as illustrated in Figure 3A by two vectors $v1$ of like length, drawn parallel to each other, and in the same sense, respectively, between points represented on the vector diagram as BE and CE. The second voltage, supplied by transformer 40, appears between the points B and C of the bridge network and is in phase quadrature relationship to those represented by the vectors $v1$. This may be represented by a vector V2 extending from a point $b$ to a point $c$ passing through point E and drawn at right angles to vectors $v1$, E being midway between $b$ and $c$. For a given amplitude of vectors $v1$ and V2 the resultant voltages applied to the grids of the amplifiers may be represented by two vectors one extending from point B to point $b$ and the other extending between point C and point $c$.

Voltage V2 is also applied to valve A3 in such a way that valve A3 together with the bridge $p$, $q$, $r$, $s$, serve as the terminating load for the network N3. The valve A3 is polarized by source 46 to be quiescent in the absence of modulation. For the positive or increment modulation halfwave, the voltage V2 of the vector diagram is reduced at the appropriate rate to zero or a value approaching zero. This shifts the phase of the resultants B$b$ and C$c$ toward each other. Voltages $v1$ simultaneously are modulated to twice the unmodulated value, giving a phase and amplitude relationship which may be indicated for the instant of peak positive modulation by doubling the value of voltage $v1$ (see Figure 3c) this being performed by the modulation of MA while reducing V2 to zero the reduction in value of V2 being performed by the action of A3 under the influence of the modulated radio frequency voltage supplied to its anode 20 from MA via N3 and 22 and lead 23 and the radio frequency voltage and modulating voltage supplied to its control grid 24 from O and SM respectively. In order that the valve A3 shall cause a diminution in value of V2 during the positive modulation halfwave, the grid receives its carrier frequency voltage in the same phase as that received by the anode, so that, when the modulating voltage on the grid 24 of A3 is positive, this tube is energized away from its quiescent condition and becomes a resistance of falling value terminating the impedance inverting network N3. The voltage V2 passed on to BC thus falls away. The action of A3 is that of modifying the value of V2 passed to the bridge $p$, $q$, $r$, $s$.

During the negative modulation half waves, the polarizing of the tube A3 makes it inoperative, and the voltage V2 is passed on to BC uninfluenced by A3. The phase relationship of the exciting vectors of A1 and A2 are thus constant during this period of the modulation cycle. It is a period during which the triangle of vectors holds a constant geometrical shape while declining in size (see Figure 3b) to zero, and back again to the side which corresponds with the carrier or unmodulated value.

To ensure a high efficiency for the power stages A1 and A2 it is necessary that the value of the unmodulated carrier exciting voltages B$b$ and C$c$ be near the saturation value. The phase angle between B$b$ and C$c$ needs to be suitably chosen, usually about 60 degrees. The valve A3 is polarized very nearly but not entirely to cut-off. By a suitable choice of these factors a very low factor of modulation distortion is ensured. There is an important practical advantage obtained by arranging the arms $p$ and $s$ of the bridge $p$, $q$, $s$ as similar impedance inverting networks in that this tends to limit the flow of grid current in amplifiers A1 and A2 during the positive modulation half-waves, with consequent improvement in so far as distortion is concerned in the modulation of the system.

It is noted that whereas triode tubes are indicated in this method of excuting the invention, tetrodes or pentodes might be substituted in some or all cases. Furthermore, the series system of modulation and the grid system of modulation as illustrated could quite easily be changed to other systems of modulation.

Figure 4:
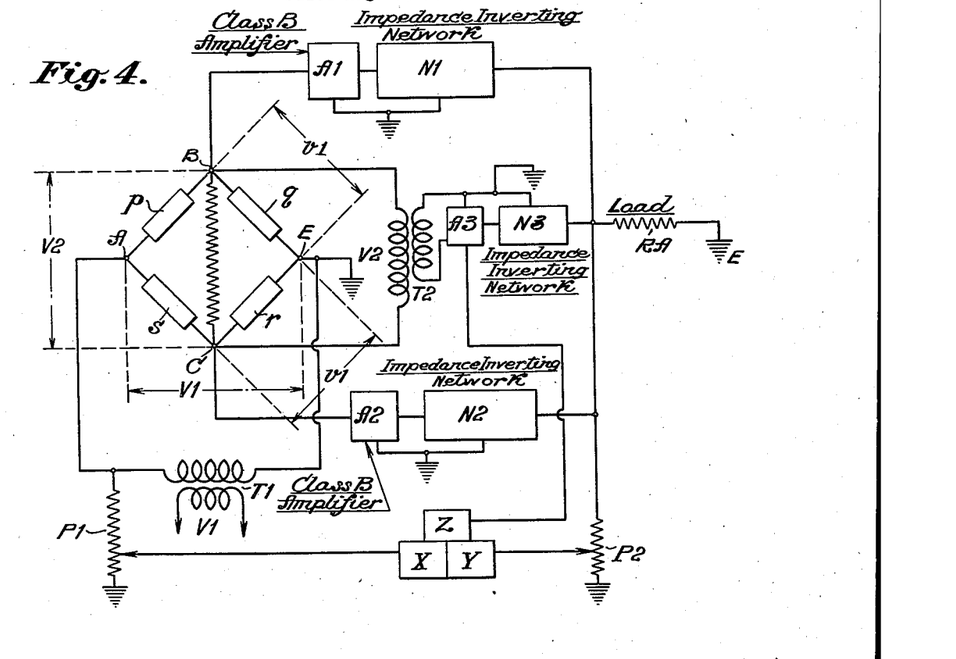
Figure 4A:
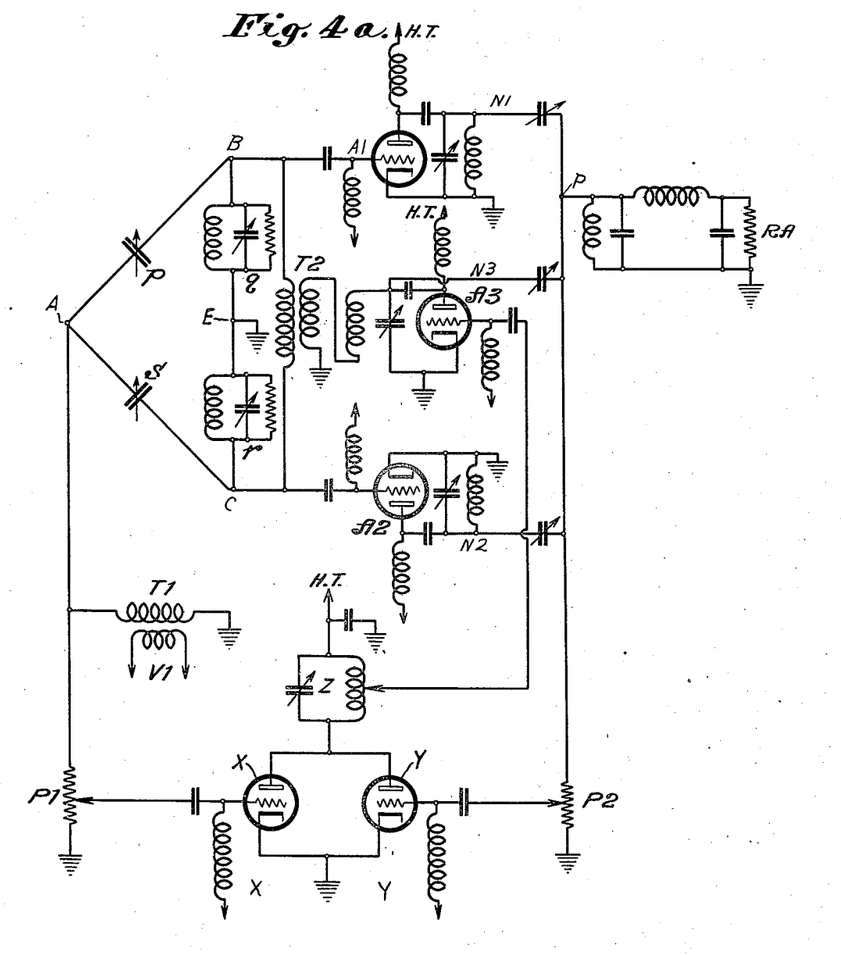
Fig. 4a illustrates somewhat in greater detail the circuit connections of the arrangement shown by block diagram in Fig. 4.

In the embodiment of the invention illustrated in Figures 4 and 4a a four-armed bridge network $p$, $q$, $r$, $s$ has the secondary winding of an input transformer T1 connected to the two ends, for convenience referred to as A and E, of one of its diagonals, the primary winding of the transformer being fed with energy V1 from a modulated source of energy. The two ends of the other diagonal, for convenience referred to as B and C, of the bridge network are connected, one to one end of the secondary winding of a tuned coupling transformer T2 and to the input circuit of one amplifier A1 and the other to the other end of the secondary winding of the tuned coupling transformer T2 and to the input circuit of a second amplifier A2, the primary winding of this transformer being fed with energy, in a manner to be described, to provide the second voltage V2. The amplifiers A1 and A2 are as before polarized to class B operation and each is coupled, preferably through an individual impedance inverting network N1 and N2 respectively, in common to a load RA and to one terminal of a further impedance inverting network N3. This further impedance inverting network N3 has its other terminal connected as in Figure 1 to the anode oscillatory circuit of an amplifier A3, the output of which is connected to the primary of the tuned coupling transformer T2. Note that in Figure 1 the voltages V1 and V2 are supplied from the output of tube MA whereas here V1 is supplied from a modulated source such as MA while V2 is supplied from a second modulated source such as A3.

The last mentioned amplifier A3 has its grid so biased that in the absence of modulation the amplifier is quiescent, that is, it makes no contribution to the voltage applied to the bridge network.

Coupled to, or otherwise associated with, the secondary winding of the input transformer T1 is the input circuit of one tube X of a balanced amplifier system. Coupled to or otherwise associated with the load circuit RA is the input circuit of another tube Y of the balanced amplifier. These two amplifiers feed into a common oscillatory circuit Z. In one way of effecting the two respective couplings, a potentiometer resistance P1 is connected across the secondary of the input transformer T1 and a point on the said potentiometer is coupled to the grid of tube X. A second potentiometer resistance P2 is connected across the load RA and a point thereon coupled to the grid of the tube Y.

The common oscillatory circuit Z is coupled to the grid of the amplifier A3, the output of which is connected to the tuned coupling transformer T2.

The system operates as follows:

Portions of the modulated voltage supplied by T1 appear between points B and E and between points C and E of the bridge network, these two portions being in equal phase for the two arms BE and CE. These two portions may be represented as illustrated in Figure 3, by two vectors $v1$ of like length, drawn parallel to each other, and in the same sense, respectively between points BE and CE. The second voltage V2 supplied by T2 appears between the points B and C of the bridge network and is in phase quadrature relationship to those represented by the vectors $v1$. This may be represented by a vector V2 extending from a point $b$ to a point $c$ passing through point E and drawn at right angles to vectors V1. For a given amplitude of vectors $v1$ and V2 the resultant voltages applied to the grids of the amplifiers may be represented by two vectors one extending from point B to point $b$ and the other extending between point C and point $c$.

In the unmodulated condition of the system (Figure 3a) the second voltage V2 merely depends upon voltage fed back from the load so that the amplitude and phase angle of the voltages (Bb and Cc) will be given by the parameters of the feed-back circuit and by the amplitude of the voltage $v1$. The initial value of the amplitude of Bb and Cc is so chosen that the two amplifiers are driven to almost the saturation value, i. e. that value above which no appreciable increase of anode output is obtained.

If now the modulated voltage be made to vary for the negative portion of the cycle of modulation the vector triangles will decrease in size but will maintain a constant geometrical shape (Figure 3b). The resultant grid excitation vectors Bb and Cc thus vary linearly for the negative half of the modulation cycle. The output voltage vectors of the amplifiers also vary substantially linearly up to the saturation value of voltage they are capable of producing at the constant anode supply voltage, but, throughout this negative half cycle, the actual output power in the load is restricted by the relative phase of the voltages Bb and Cc.

For values of excitation of the amplifiers above the saturation value, no appreciable increase of output would normally be obtained.

When the resultant grid voltages increase beyond the saturation value for the amplifiers, the ratio of input (modulated) voltage to the output energy increases, this resulting in a relative reduction in fed-back voltage (V2) and consequently in a modification in the geometrical shape of the vector triangles, the two vectors Bb and Cc approaching nearer to the in-phase condition. This condition produces some increase of output and thus tends to correct for the saturation tendency. This action might be termed the inherent correction effect.

A further correction is produced by the correction voltage provided by the balanced amplifier and applied to the grid of the amplifier feeding the tuned transformer which operates as follows:

For the negative half of the modulation cycle and for carrier frequency condition, a balanced condition exists between portions of the input voltage and output voltage tapped off the two potentiometers and no correction voltage, other than the inherent correction voltage, is provided. For any falling off of the output voltage compared with the input voltage of the transmitter, a resultant voltage is produced by the balanced amplifier and this causes the amplifier to act as an oscillation generator, the phase of the oscillations being such as to decrease the amplitude of the second voltage. In the limit, when the terminal impedance of the impedance inverting network N3 approaches to zero under the action of the valve A3 the voltage V2 disappears and the two amplifiers A1 and A2 are then driven in phase under the influence of the modulated voltage. Although the amplitudes of the resultant voltages applied to the grids of the amplifiers will, under these correction conditions, be greatly increased, the output voltages of the amplifiers will remain substantially constant at the saturation value and increased output power in the load circuit is obtained because of the approach to in-phase condition of the significant vectors.

The actual increase of excitation from the unmodulated value to the peak positive modulation value will be considerably less than a double of Bb and Cc, but an increase is a desirable feature in that it tends to counteract the saturation and other distortion phenomena characteristic of valve operation.

The correction effect would be just as effective in dealing with any non-linear distortion occurring during the negative half cycle, the only difference being in the phase of the correcting voltage applied to the grid of the valve feeding the tuned transformer. Where the output distortion is of a "peaking" nature, there would be a certain phase for the correction voltage but for an "attenuation" distortion of the output, the phase of the correction voltage would be reversed.

Figure 5:
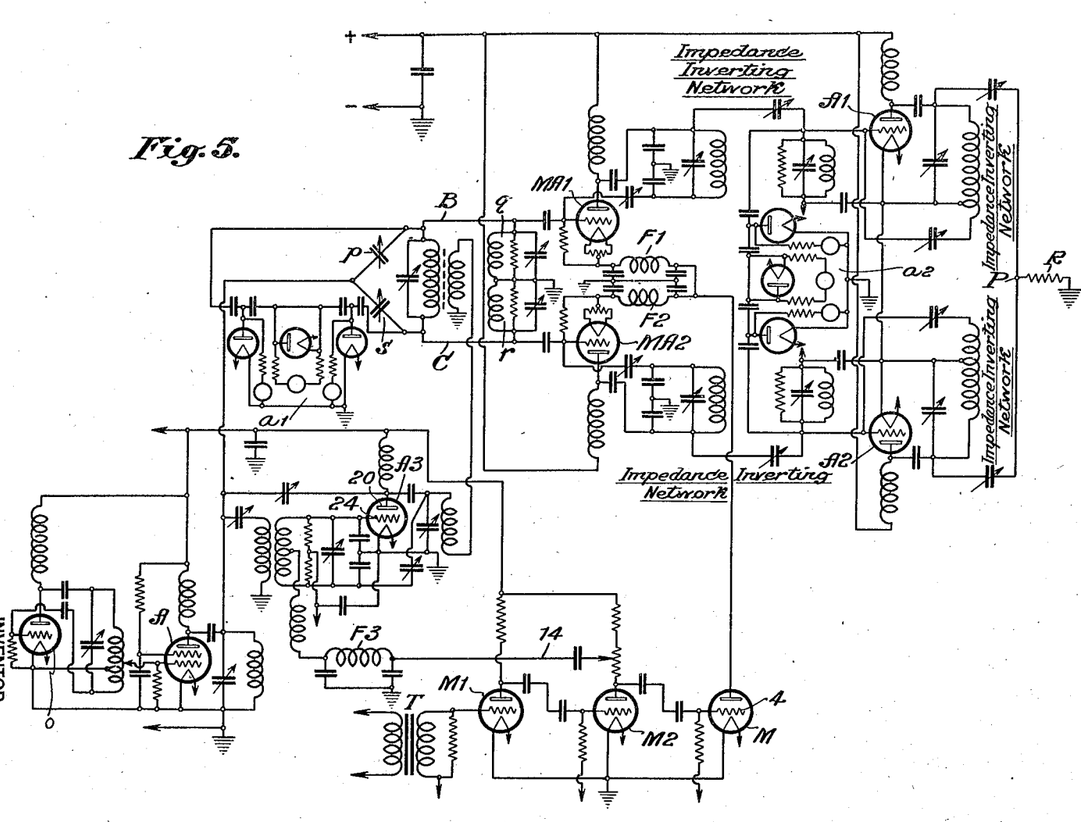
Fig. 5 illustrates somewhat completely a modified modulation arrangement of the nature of that disclosed in Fig. 2 and Figs. 6a, 6b and 6c, 7a, 7b and 7c, 8a, 8b and 8c, 9a, 9b and 9c are vector diagrams illustrating operation of the system shown in Fig. 5.

In the arrangement of Figure 5, which figure gives a complete circuit diagram of a preferred arrangement, the points B,C of the bridge are connected to the grids of two modulator-amplifier tubes MA1 and MA2 and these valves are series modulated by modulator valve M. The modulator-amplifier valves MA1 and MA2 are driven to saturation and the anode voltage of them is modulated by series modulator M. The power stage valves are, as before, indicated by A1 and A2, the phase correcting valve by A3, the oscillator by O, and this is followed by an amplifier A. Valves M1 and M2 are the modulation frequency amplifiers and T is a transformer feeding modulation signals into these amplifiers. a1 and a2 are monitoring units for checking the operating angle. The F1, F2 and F3 indicate filters whose impedance is constant over the range of modulation frequencies. Monitoring units will be described in connection with Figure 10. Amplifiers A1 and A2 set to work in class B are coupled by independent impedance inverting networks to a common load R. The networks shown are intended to have an inductance limb of each incorporated with the inductance limb of the corresponding tank circuit. The other inductance limb of each network is to be regarded as being incorporated with the load R. For greater clarity these might be shown as a single inductance in shunt with R, but as R would normally be a tuned circuit coupling to a feeder or an aerial circuit the complementary inductances for the networks could and would in practice be a part of the circuit R.

The amplifiers A1 and A2 are coupled one to MA1 and the other to MA2. Coupling by quarter wave network is shown again in each case, where the inductance limbs of one network are incorporated in the anode tank circuit of MA1, and grid tank circuit of A1, and the inductance limbs of the other network are incorporated in the anode tank circuit of MA2 and in grid tank circuit of A2.

The grids of MA1 and of MA2 are excited with a radio frequency voltage derived from opposite corners of a scheme of components arranged in bridge formation p, q, r, s, the arms q and r each consisting of a combination of inductance capacity and damping resistance. The arm q with arm p, and a component incorporated in the inductance of anode tank of amplifier A together form a quarter wave impedance inverting network, the tuning of arm q and of tank circuit of A being effected to obtain this condition. The same is true of the components r, s and another inductance incorporated in anode tank circuit A, the two networks together forming a balanced bridge formation. Across the junction point of p and s and the junction point of arms q and r, viz. earth, the constant amplitude voltage v1 of the system is applied. Across the points BC another voltage V2 is applied, this second voltage being obtained via the tuned transformer across BC which transformer primary is energized from the anode tank circuit of A3. Now the anode tank circuit of A3 receives its radio frequency energy from amplifier A and by an impedance inverting quarter wave network, only the capacity arm of which is shown for the inductance limbs are again incorporated in the tank circuits which are coupled together. Valve A3 also receives a radio frequency voltage across its grid/cathode having the same phase as the voltage applied across its anode/cathode, this grid radio frequency voltage being obtained from the same source, A, as supplies the anode tank circuit energy. The grid circuit is arranged so as to provide means for neutralizing the grid/anode capacity of the valve A3. By means of these connections, couplings and in-phase condition of the grid and anode voltages of A3 the valve is effectively a resistance across its own anode tank circuit which forms a part of an impedance inverting network. Further, by superposing voltages in conformity with the modulation on the radio frequency voltage supplied to the grid of this valve A3, the valve is made to function as a variable resistance across its tank circuit, having the minimum resistance when the modulation potential is positive, and the maximum resistance when the modulation is negative. In practice the static bias of this valve A3 is chosen so that in the absence of modulation, the valve is made to pass very little current, that is, the initial point is just on the bottom-bend of the valves anode current/grid voltage characteristic with the radio frequency excitation applied to the grid. The modulating potentials for this valve A3 are obtained from a potentiometer in the anode circuit of modulating valve M2, which in turn is driven by M1 obtaining its grid modulating signal from audio transformer T.

Valve M2 also drives the grid of valve M, which is the main modulator arranged in the well-known series scheme with the modulated amplifiers MA1 and MA2. Valve M provides anode voltage modulation of MA1 and MA2, whilst the phase of the modulating voltage supplied to the grid of valve A3 is also such as to cause A3 to become a low resistance across its anode tank circuit for positive modulation whilst effecting substantially no influence on this tank circuit during the negative half cycle.

In this way valve A3 is caused to produce the effect of reducing the phase angle between the resultant driving voltage vectors of MA1 and MA2 during the positive half of modulation whilst permitting the maintenance of a substantially constant phase angle between the same vectors during the negative half of modulation.

The correct quadrature relationship between the components V1 and V2 of the resultant voltages exciting the grids of MA1 and MA2 is required, and closely the same phase relationship is to be maintained between the exciting voltages of A1 and A2.

The monitoring devices α1 and α2 are provided to check up on this condition.

The filters F1 and F2 are inserted to maintain a substantially constant resistive impedance for the effective load of valve M over the range of modulating frequencies.

A similar filter for equalization of phase shift with modulating frequency is inserted in the line conducting the modulating potentials to valve A3.

By a suitable choice of the amplitude of carrier drive voltage to valves A1 and A2 together with the working point near the bottom bend of valve A3 characteristic curve of output/input, relative amplitudes of significant voltages and the operating angle, a low modulation distortion together with high carrier efficiency for the system is ensured.

The arrangement of Figure 5 has the advantage over that of Figure 2 that adequate provision is made for overcoming the effects in valves A1 and A2 of falling generated voltages with increased load during the positive half of modulation wave. This is effected by arranging that the effective amplitudes of the grid excitation for valves A1 and A2 are caused to attain values at the positive peak of modulation approximating to twice their values in the carrier or unmodulated condition.

Figure 6A:
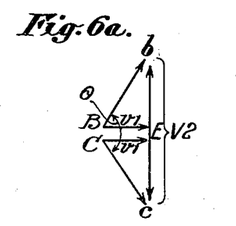
Figure 6B:
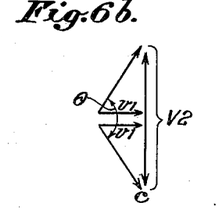
Figure 6C:
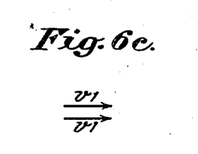
Figure 7A:
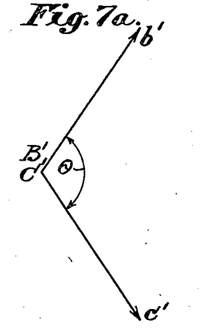
Figure 7B:
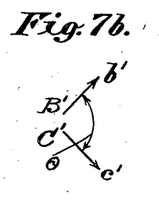
Figure 7C:
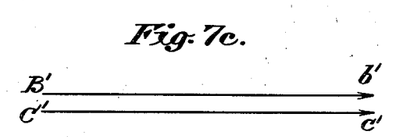

Figures 6 and 7 are vector diagrams relating to Figure 5. Figures 6a, 6b, and 6c show the grid vector conditions for valves MA1 and MA2. Vectors $v1$(BE) and $v1$(CE) are the in-phase vectors provided by the coupling or amplifier A to one corner of the bridge $p$, $q$, $r$, $s$. Vector V2 is obtained from A3 and divides between the two grid circuits as Eb and Ec, giving resultant drives for MA1 and MA2, illustrated by vectors Bb and Cc respectively. The angle between them, $\theta$, is determined by the relative amplitudes of $v1$ and $v2$, and is not highly critical, but will depend to some extent on the regulation factor of the valves used in the final power stage. A value of 120 degrees is generally satisfactory, but it may be made greater and even smaller with valves having a good regulation factor.

Figure 6a is the grid circuit condition of MA1 and MA2 in the carrier setting. Figure 6b is an instant during the negative half of modulation, the vector diagram being substantially the same shape as for the carrier condition due to valve A3 being biased to class B operation and being therefore inoperative for negative modulation. Figure 6c is the grid vector condition at the peak modulation condition, where V2 has been completely eliminated by the action of A3. A value of operating angle greater than $\theta - 120$ degrees might be chosen, which would necessitate a smaller change of phase angle during the positive half of modulation, and thus the vectors Bb and Cc would not then attain the inphase condition, represented by Figure 6c.

Figures 7a, 7b and 7c represent the vector conditions for the anode voltages of MA1 and MA2 and also on a different scale for the grid voltages of A1 and A2. The operating angle $\theta$ is governed by and is substantially the same as the operating angle, or relative phase of the grid voltages of the two amplifiers MA1 and MA2, but the amplitudes are dependent on the instantaneous anode voltage of the two said amplifiers being directly proportional if the grid drive be suitably chosen. Figure 7a represents the carrier condition, 7b an instant during negative modulation, and 7c the peak positive modulation instant.

Figure 8A:
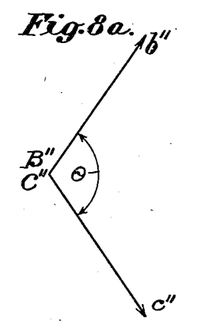
Figure 8B:
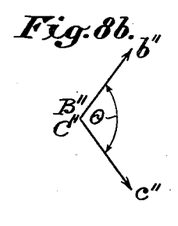
Figure 8C:
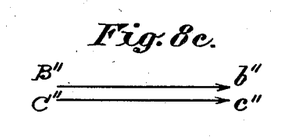

Figures 8a, 8b and 8c represent the conditions of voltages for corresponding instants for the anode oscillatory circuits of valves A1 and A2.

Figure 9A:
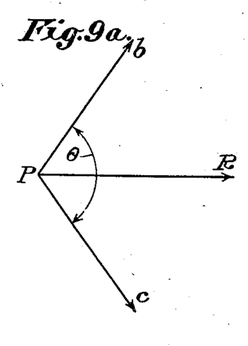
Figure 9B:
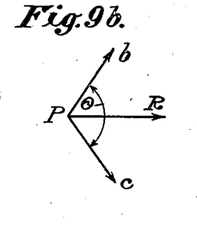
Figure 9C:
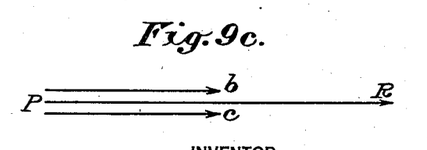

Figures 9a, 9b and 9c represent corresponding instants for the current vectors associated with the junction point P.

In all the methods described, due to the fact that the power valves A1 and A2 have their anode circuits coupled together at the junction point with load R and that the valves are excited with grid voltages having different phase angles, the valves are ensured a resistive load condition for all exciting values up to carrier level by arranging that the anode tuned circuits of the two valves are adjusted, one having positive reactance, and the other negative reactance, so as to neutralize the reactance load reflected to one valve, due to the phase of the oscillations of the other. This results in a somewhat non-resistive condition for the valves from the carrier level up to peak output, or 100% positive modulation. But this occurs when the loading is reaching a maximum, and results in negligible loss of efficiency.

This slightly non-resistive condition also modifies slightly the phase angle of the anode voltages of valves A1 and A2 during this positive modulation period, but this again can be compensated for by the action of valve A3 in the systems.

Figure 10:
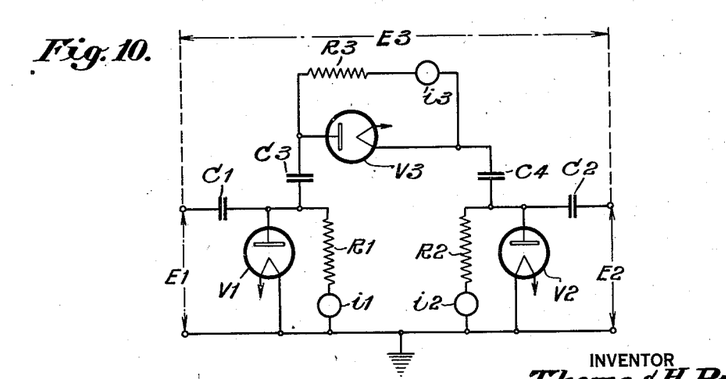

Figure 10 illustrates a part of the monitoring system for use in the systems above described, and comprises three peak voltmeters so connected that the phase relationship between a pair of voltages E1 and E2 may be measured, where, as it frequently happens in modern transmitting technique, the voltages E1 and E2 are equal.

Assume $E1 = E2$ $$R1 = R2 = R3$$

Then $i1\ R1 = i2$, $R2 = E1 = E2$ and $i3\ R3 = E3$.
Further, if $E1 = E2$ $$E3 = 2E1 \sin \frac{\theta}{2}$$

where $\theta$ is phase angle difference between E1 and E2.
Then $$\sin \frac{\theta}{2} = \frac{E3}{2E1} = \frac{i3}{2i1} = \frac{i3}{2i2}$$

and $$\theta = 2 \sin^{-1} \frac{i3}{2i1}$$

Thus the value of $\theta$ is obtained from a knowledge of the peak voltmeter current values. Alternatively, by a suitable choice of the values of resistances R1, R2 and R3 the assembly may be made so that the instrument $i3$ can be calibrated and marked to indicate the phase angle direct, thus obviating the need for calculation of the angle from the observed values of the three peak voltmeter currents.

The arrangement comprises a diode V1 having connected across its anode/cathode space a resistance R1 and an ammeter $i1$ and a similar diode V2 having connected across its anode/cathode space a similar resistance R2 and ammeter $i2$, the resistance and ammeter in each case being in series. The two voltages E1 and E2 to be compared are applied respectively across the anode/cathode space of the two diodes through blocking condensers C1 and C2. A third diode V3 having connected across its anode/cathode space a resistance R3 in series with an ammeter $i3$ is connected (or rather coupled by blocking condenser C3 and C4) across from the anodes of diodes V1 and V2.

The invention is susceptible of other modification. Thus linear amplifiers might be inserted between the power stage valves and the valve shown as driving them in the methods herein described.

Tetrodes or pentodes might be substituted for some or all valves. Alternative methods of modulation other than the series or grid methods, herein described, might be employed. Another possible modification might be that A3 in the arrangement of Figure 4, instead of receiving its grid radio frequency and modulation frequency controlling voltages from the balanced amplifier in Figure 4 receives these controlling voltages as A3 does in the arrangement of Figure 2.

A number of such variations will suggest themselves to those familiar with such radio frequency circuits.

I claim:

1. A modulated wave amplifier including, a pair of electron discharge tubes each having a control grid, an anode and a cathode, an output circuit coupled to the anode and cathode of said tubes, means for applying modulated wave voltages of like phase to said control grids, means for applying modulated voltages of substantially opposed phase to said control grids, the last voltages being substantially in phase quadrature relative to the voltages of like phase, and means for varying the amplitude of the applied phase opposed voltages as a function of the ratio of the applied modulated voltage to the power supplied to the said output circuit.

2. A modulated wave amplifier including, a pair of electron discharge tubes each having a control grid, an anode and a cathode, an output circuit coupled to the anodes and cathodes of said tubes, means for applying modulated wave voltages of like phase to said control grids, means for applying modulated voltages of substantially opposed phase to said control grids, the last voltages being substantially in phase quadrature relative to the voltages of like phase, means for varying the amplitude of the phase opposed voltages in accordance with the modulations thereon on positive portions of the modulation cycle, and means for varying the amplitude of the applied phase opposed voltages as a function of the ratio of the applied modulated voltage to the power supplied to the said output circuit.

3. The method of modulation of carrier wave energy in accordance with modulation current of complex wave form characteristic of signals which includes the steps of combining two portions of said carrier wave energy in phase displaced relation to provide a resultant, controlling the amplitude of said combined wave energy portions in accordance with the modulation current amplitude on the negative part of the modulation cycle to correspondingly vary the amplitude of said resultant, and controlling the amplitude of the wave energy of one portion substantially only in accordance with the modulation current on the positive part of the modulation current cycle to correspondingly vary the amplitude of the resultant.

4. The method of modulation of carrier wave energy in accordance with modulation current of complex wave form characteristic of signals which includes the steps of combining two portions of said carrier wave energy in phase displaced relation to provide a resultant, controlling the amplitude of said combined wave energy portions in accordance with the modulation current amplitude on the negative part of the modulation cycle to correspondingly vary the amplitude of said resultant, controlling the amplitude of the wave energy of one portion substantially only in accordance with the modulation current on the positive part of the modulation current cycle to correspondingly vary the amplitude of the resultant and modifying the extent to which the amplitude of the said one portion of wave energy is controlled on the positive part of the modulation cycle when the modulation exceeds a selected amplitude.

5. The method of modulation of carrier wave energy in accordance with modulation current of complex wave form characteristic of signals which includes the steps of combining two portions of said carrier wave energy in phase displaced relation to provide a resultant, controlling the amplitude of said combined wave energy portions in accordance with the modulation current amplitude on the negative parts of the modulation cycle to correspondingly vary the amplitude of said resultant, controlling the amplitude of the wave energy of one portion substantially only in accordance with the modulation current amplitude on the positive part of the modulation current cycle to vary the amplitude of the resultant, and additionally controlling the amplitude of said last mentioned one portion when the ratio of said modulation current amplitude to the amplitude of said resultant increases.

6. The method of modulation of carrier wave energy in accordance with modulation current of complex wave form characteristic of signals which includes the steps of combining two portions of said carrier wave energy in phase displaced relation to provide a resultant, controlling the amplitude of said combined wave energy portions in accordance with the modulation current amplitude during the negative part of the modulation cycle to correspondingly vary the amplitude of said resultant, and controlling the phase of combination of the wave energy portions during the positive portion of the modulation current cycle to correspondingly vary the amplitude of the resultant.

7. The method of modulation of carrier wave energy in accordance with modulation current of complex wave form characteristic of signals which includes the steps of combining two portions of said carrier wave energy in phase displaced relation to produce a resultant, controlling the amplitude of said combined wave energy portions in accordance with the modulation current amplitude during the negative part of the modulation cycle to correspondingly vary the amplitude of said resultant, controlling the phase of combination of the wave energy portions during the positive portion of the modulation current cycle to correspondingly vary the amplitude of the resultant and additionally controlling the phase of combination of the said portions of wave energy on the positive part of the modulation cycle when the modulation exceeds a selected amplitude.

8. The method of modulation of carrier wave energy in accordance with modulation current of complex wave form characteristic of signals which includes the steps of combining two portions of said carrier wave energy in phase displaced relation to provide a resultant, controlling the amplitude of said combined wave energy portions in accordance with the modulation current amplitude during the negative part of the modulation cycle to correspondingly vary the amplitude of said resultant, controlling the phase of combination of the wave energy portions during the positive portion of the modulation cycle to correspondingly vary the amplitude of the resultant, and additionally controlling the phase of combination of the wave energy portions when the ratio of said modulation current amplitude to the amplitude of said resultant increases.

9. The method of modulating carrier wave energy in accordance with modulation current of complex wave form characteristic of signals which include the steps of producing two phase opposed voltages characteristic of said wave energy, producing two voltages of like phase characteristic of said wave energy, combining each of said first two produced voltages with a different one of said second named two voltages to produce two resultants displaced in phase by a selected amount, controlling the amplitude of all of said produced voltages in accordance with said modulation currents during the negative portions of the modulation current cycle, and controlling the amplitude of the two produced voltages of opposed phase in accordance with the modulation current during the positive half cycles of the modulation current cycle.

10. The method of modulating carrier wave energy in accordance with modulation current of complex wave form characteristic of signals which include the steps of producing two phase opposed voltages characteristic of said wave energy producing two phase opposed voltages characteristic of said wave energy, combining each of said first two produced voltages with a different one of said second named two voltages to produce two resultants displaced in phase by a selected amount, controlling the amplitude of all of said produced voltages in accordance with said modulation currents during the negative portions of the modulation current cycle, modulating the amplitude of the two produced voltages of opposed phase in accordance with the modulation current during the positive halves of the modulation current cycle and modifying the extent to which the last mentioned two produced voltages are modulated during the positive half cycles of the modulation current when the modulation current amplitude exceeds a selected value.

11. In a modulation system, a source of wave energy of carrier wave frequency, a source of modulating potentials, a pair of electron discharge devices, having input and output electrodes, means coupled with said sources for applying voltages characteristic of said carrier wave energy modulated in accordance with said modulating potentials in like phase on the input electrodes of said devices, means coupled with said sources for applying voltages characteristic of said carrier wave energy modulated in accordance with said modulation potentials substantially in phase opposed relation on the input electrodes of said devices, an output circuit coupled with the output electrodes of said devices and means coupled with said last named means for reducing the amplitude of the said opposed voltages in accordance with the modulating potentials during the negative half cycles of said modulation currents.

12. In a modulation system, a source of wave energy of carrier wave frequency, a source of modulating potentials, a pair of electron discharge devices each having input and output electrodes, means for applying voltages characteristic of said carrier wave energy modulated in accordance with said modulating potential in like phase on the input electrodes of said devices, means for applying voltages characteristic of said carrier wave energy modulated in accordance with said modulation potentials substantially in phase opposed relation on the input electrodes of said devices, an output circuit coupled with the output electrodes of said devices, a modulation tube having input and output electrodes, means for applying carrier wave energy of like phase to the input and output electrodes of said tube and means for lowering the impedance of said tube during the positive cycles of the modulation.

13. In a modulation system, a source of wave energy of carrier wave frequency to be modulated, a source of modulating potentials, a pair of electron discharge devices each having input electrodes and having output electrodes, a utilization circuit coupled to said output electrodes, means for applying wave energy of carrier wave frequency and substantially constant amplitude in phase and in phase opposition on the input electrodes of said devices, means for modulating the impedances of said devices in phase in accordance with said modulation currents, a tube modulator having input and output electrodes excited in phase by said wave energy, means for biasing said tube for small output, means for applying modulating potentials to said tube, means for impressing wave energy produced in said last named tube in phase displaced relation on the input electrodes of said pair of tubes, and means coupling the output of said tube modulator across the input electrodes of said devices.

THOMAS HENRY PRICE.